United States Patent
Lee et al.

(10) Patent No.: US 9,913,123 B2
(45) Date of Patent: Mar. 6, 2018

(54) METHOD FOR DETECTING SEARCH SIGNAL FOR DEVICE-TO-DEVICE (D2D) COMMUNICATION IN WIRELESS COMMUNICATION SYSTEM, AND APPARATUS THEREFOR

(71) Applicant: LG ELECTRONICS INC., Seoul (KR)

(72) Inventors: Seungmin Lee, Seoul (KR); Hyukjin Chae, Seoul (KR); Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 14/900,545

(22) PCT Filed: Jul. 21, 2014

(86) PCT No.: PCT/KR2014/006592
§ 371 (c)(1),
(2) Date: Dec. 21, 2015

(87) PCT Pub. No.: WO2015/009123
PCT Pub. Date: Jan. 22, 2015

(65) Prior Publication Data
US 2016/0150391 A1   May 26, 2016

Related U.S. Application Data

(60) Provisional application No. 61/856,067, filed on Jul. 19, 2013, provisional application No. 61/901,464, filed on Nov. 8, 2013.

(51) Int. Cl.
*H04L 12/24* (2006.01)
*H04W 8/00* (2009.01)
(Continued)

(52) U.S. Cl.
CPC ........... *H04W 8/005* (2013.01); *H04L 1/0038* (2013.01); *H04L 5/0051* (2013.01);
(Continued)

(58) Field of Classification Search
CPC ..... H04W 84/18; H04W 84/20; H04W 84/22; H04W 20/021
See application file for complete search history.

(56) References Cited

U.S. PATENT DOCUMENTS

| 8,477,701 B2 | 7/2013 | Nam et al. |
|---|---|---|
| 2009/0168922 A1 | 7/2009 | Malladi et al. |

(Continued)

FOREIGN PATENT DOCUMENTS

| CN | 103039103 | 4/2013 |
|---|---|---|
| WO | 2012/173394 | 12/2012 |

(Continued)

OTHER PUBLICATIONS

Author Unknown, On Resource Allocation and System Operation for D2D Discovery, Submission to 3GPP TSG RAN WG1 Meeting #74bis, Doc. No. R1-134141, pp. 1-10, Oct. 11, 2013.*

(Continued)

*Primary Examiner* — Christopher Crutchfield
(74) *Attorney, Agent, or Firm* — Lee Hong Degerman Kang Waimey

(57) ABSTRACT

The present invention relates to a method for detecting a search signal of a first terminal for device-to-device (D2D) communication in a wireless communication system. Specifically, the method comprises the steps of: receiving search signals from second terminals; and obtaining control information for D2D communication by carrying out blind decoding of the search signals, wherein a search space for the blind decoding consists of at least one virtual resource block (VRB) set configured on the basis of multiple physical resource block sets which are predefined such that the search signals are assigned thereto.

6 Claims, 12 Drawing Sheets

(51) Int. Cl.
*H04W 84/18* (2009.01)
*H04W 56/00* (2009.01)
*H04W 72/02* (2009.01)
*H04L 1/00* (2006.01)
*H04L 5/00* (2006.01)
*H04L 27/26* (2006.01)
*H04W 72/04* (2009.01)
*H04B 7/26* (2006.01)

(52) U.S. Cl.
CPC ........ *H04L 5/0091* (2013.01); *H04L 27/2666* (2013.01); *H04W 56/002* (2013.01); *H04W 72/02* (2013.01); *H04W 72/048* (2013.01); *H04W 84/18* (2013.01); *H04B 7/2656* (2013.01)

(56) References Cited

U.S. PATENT DOCUMENTS

2010/0195614 A1* 8/2010 Nimbalker ........ H04W 72/1289
370/330
2013/0155872 A1* 6/2013 Subramanian ........ H04W 24/06
370/242
2015/0237591 A1* 8/2015 Shukair ............. H04W 56/0045
370/329

FOREIGN PATENT DOCUMENTS

WO  2013/062310  5/2013
WO  2013/081370  6/2013

OTHER PUBLICATIONS

Author Unknown, Resource allocation for D2D discovery, Submission to 3GPP TSG RAN WG1 Meeting #74bis, Doc. No. R1-134336, pp. 1-4, Oct. 11, 2013.*

Author Unknown, On physical layer design for D2D discovery, Submission to 3GPP TSG RAN WG1 Meeting #74bis, Doc. No. R1-134140, pp. 1-9, Oct. 11, 2013.*

PCT International Application No. PCT/KR2014/006592, Written Opinion of the International Searching Authority dated Nov. 6, 2014, 19 pages.

The State Intellectual Property Office of the People's Republic of China Application Serial No. 201480040716.2, Office Action dated Jul. 18, 2017, 10 pages.

* cited by examiner

FIG. 2
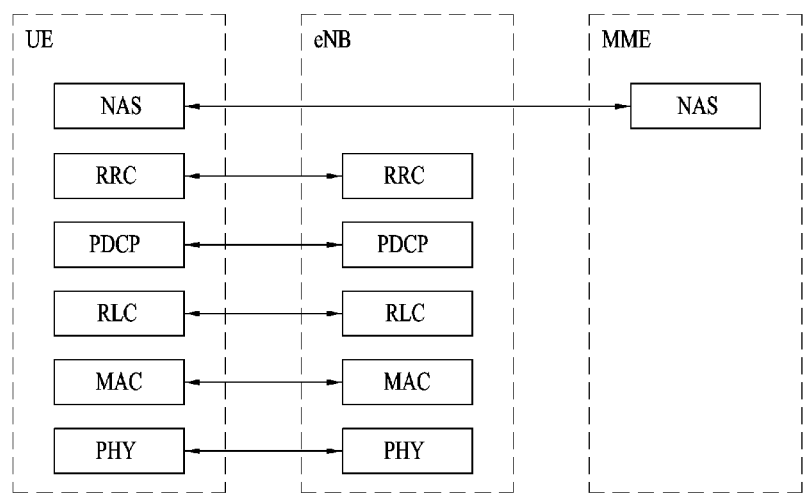
(a) control-plane protocol stack
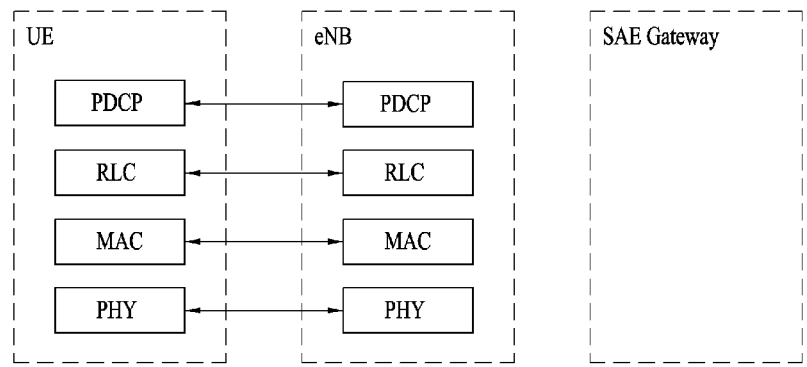
(b) user-plane protocol stack FIG. 8
(a) 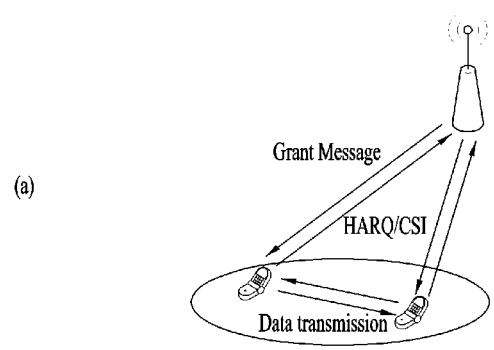
(b) 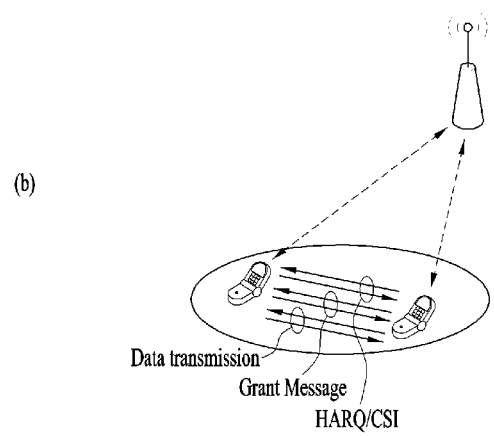

FIG. 9
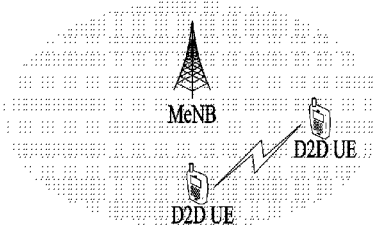
(a) Case in which D2D UEs performing D2D communication are within network coverage
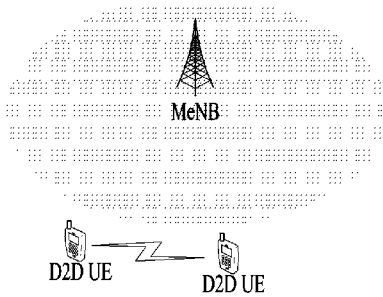
(b) Case in which D2D UEs performing D2D communication are outside network coverage
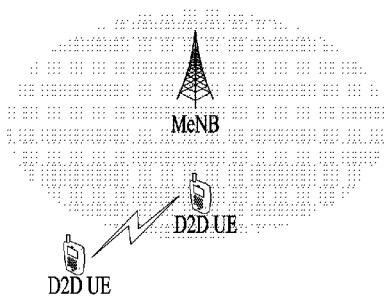
(c) Case in which some D2D UEs performing D2D communication are within network coverage and the other D2D UEs are outside network coverage FIG. 10A
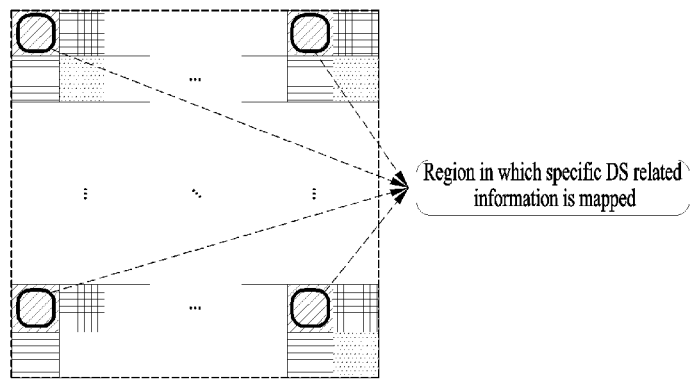
(a) Predefined physical resource domain for DS transmission in which a total of K_P DSs is transmitted
Rule (re)constructing DS related information present in physical resource domain in logical resource domain
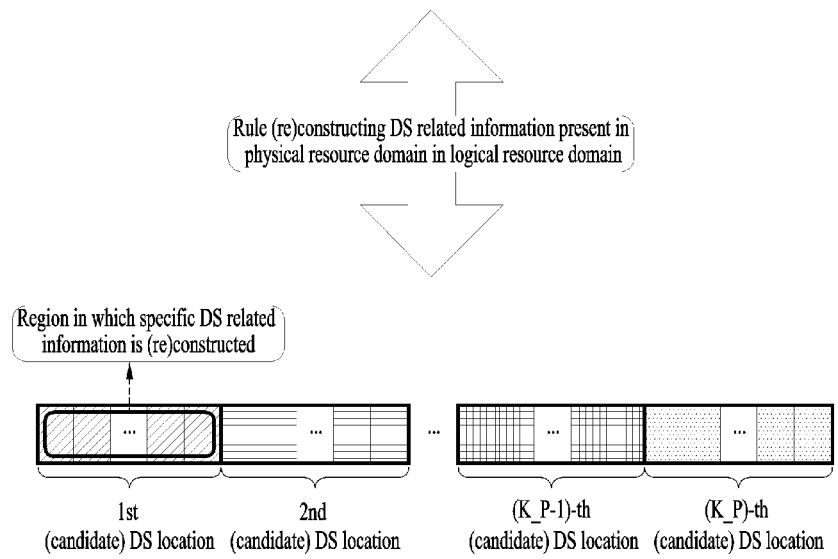
(b) Logical resource domain in which a total of K_L DSs can be decoded FIG. 10B
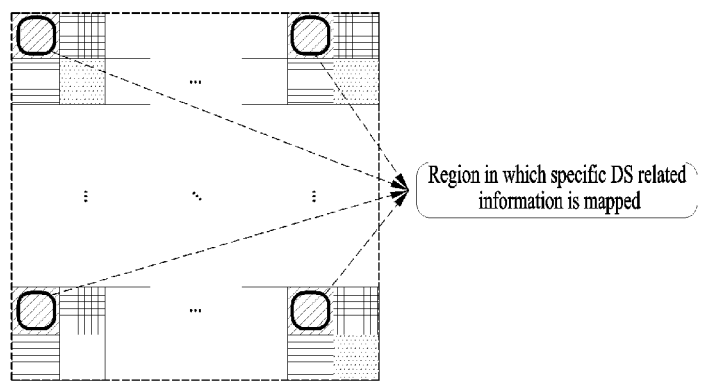
(a) Predefined physical resource domain for DS transmission in which a total of K_P DSs is transmitted
Rule (re)constructing DS related information present in physical resource domain in logical resource domain
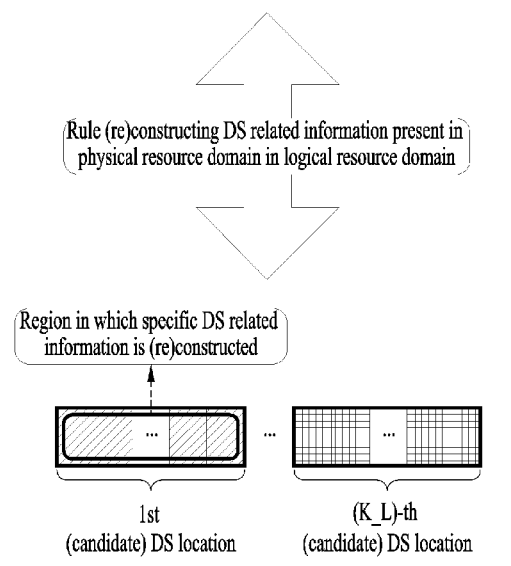
(b) Logical resource domain in which a total of K_L DSs can be decoded

METHOD FOR DETECTING SEARCH SIGNAL FOR DEVICE-TO-DEVICE (D2D) COMMUNICATION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2014/006592, filed on Jul. 21, 2014, which claims the benefit of U.S. Provisional Application No. 61/856,067, filed on Jul. 19, 2013, and 61/901,464, filed on Nov. 8, 2013, the contents of which are all hereby incorporated by reference herein in their entirety.

TECHNICAL FIELD

The present invention relates to a wireless communication system and, more particularly, to a method for detecting a discovery signal for D2D communication and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

To assist an eNB in efficiently operating a wireless communication system, a UE periodically and/or aperiodically reports state information of a current channel to the eNB. Since the reported channel state information may include results calculated in consideration of various situations, a more efficient reporting method for the channel state information is needed.

DISCLOSURE

Technical Problem

An object of the present invention based on the above-described discussion is to provide a method for detecting a discovery signal for D2D communication in a wireless communication system and an apparatus therefor.

The technical objects that can be achieved through the present invention are not limited to what has been particularly described hereinabove and other technical objects not described herein will be more clearly understood by persons skilled in the art from the following detailed description.

Technical Solution

In an aspect of the present invention for solving the above-described problem, provided herein is a method for detecting a discovery signal for device-to-device (D2D) communication by a first user equipment (UE) in a wireless communication system, including receiving the discovery signal from second UEs; and acquiring control information for D2D communication by performing blind decoding of the discovery signal, wherein a search space for blind decoding includes at least one virtual resource block (VRB) set configured based on a plurality of physical resource block sets predefined to allocate the discovery signal.

The discovery signal may be blind-decoded based on a predefined reference signal. The reference signal may be defined to estimate an effective channel over which a discovery signal of a D2D UE is transmitted.

The discovery signal may be identified according to a reference signal resource allocated differently to the second UEs. The reference signal resource may be associated with at least one of an antenna port number, a cyclic shift index, a scrambling identifier, a physical cell identifier, a virtual cell identifier, and an orthogonal cover code (OCC) index.

The discovery signal may be blind-decoded based on a reference signal resource randomly selected from a reference signal resource pool signaled from a base station. The reference signal resource pool may be cell-specific.

The discovery signal may be blind-decoded based on energy detection of a predefined reference signal.

In another aspect of the present invention for solving the above-described problem, provided herein is a method for detecting a discovery signal for device-to-device (D2D) communication by a first user equipment (UE) in a wireless communication system, including receiving a discovery signal from second UEs; and acquiring control information for D2D communication by performing blind decoding of the discovery signal, wherein a search space for blind decoding is determined based on the number of discovery resource units (DRUs) per discovery subframe (DSF) and the number of reference resource candidates per DRU, and wherein at least one of the number of DRUs per DSF and the number of reference signal resource candidates per DRU is determined based on system bandwidth for D2D communication.

In still another aspect of the present invention for solving the above-described problem, provided herein is a first user equipment (UE) for detecting a discovery signal for device-to-device (D2D) communication in a wireless communication system, including a radio frequency unit; and a processor, wherein the processor is configured to receive the discovery signal from second UEs and to acquire control information for D2D communication by performing blind decoding of the discovery signal, and wherein a search space for blind decoding includes at least one virtual resource block (VRB) set configured based on a plurality of physical resource block sets predefined to allocate the discovery signal.

Advantageous Effects

According to embodiments of the present invention, a discovery signal for D2D communication can be efficiently performed in a wireless communication system.

The effects that can be achieved through the present invention are not limited to what has been particularly described hereinabove and other advantages not described herein will be more clearly understood by persons skilled in the art from the following detailed description.

DESCRIPTION OF DRAWINGS

The accompanying drawings, which are included to provide a further understanding of the invention, illustrate embodiments of the invention and together with the description serve to explain the principle of the invention.

FIG. 2 is a diagram illustrating structures of a control plane and a user plane of a radio interface protocol between a user equipment and E-UTRAN based on the 3GPP radio access network standard.

FIG. 8 is a diagram referred to for explaining D2D communication.

FIG. 9 is a diagram referred to for explaining scenarios in which D2D communication is performed.

FIG. 10 is a diagram referred to for explaining the case in which a discovery signal (DS) received in a physical resource domain is reconstructed in a logical resource domain.

BEST MODE

Figure 1:
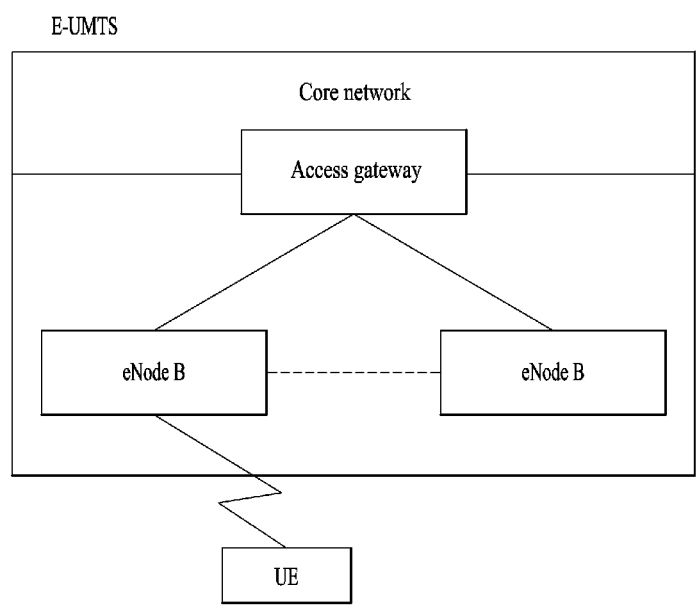
FIG. 1 is a diagram illustrating a network structure of an Evolved Universal Mobile Telecommunications System (E-UMTS) which is an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
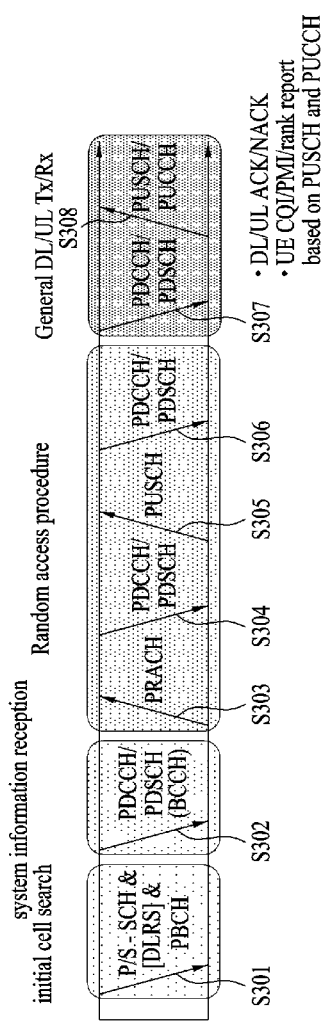
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
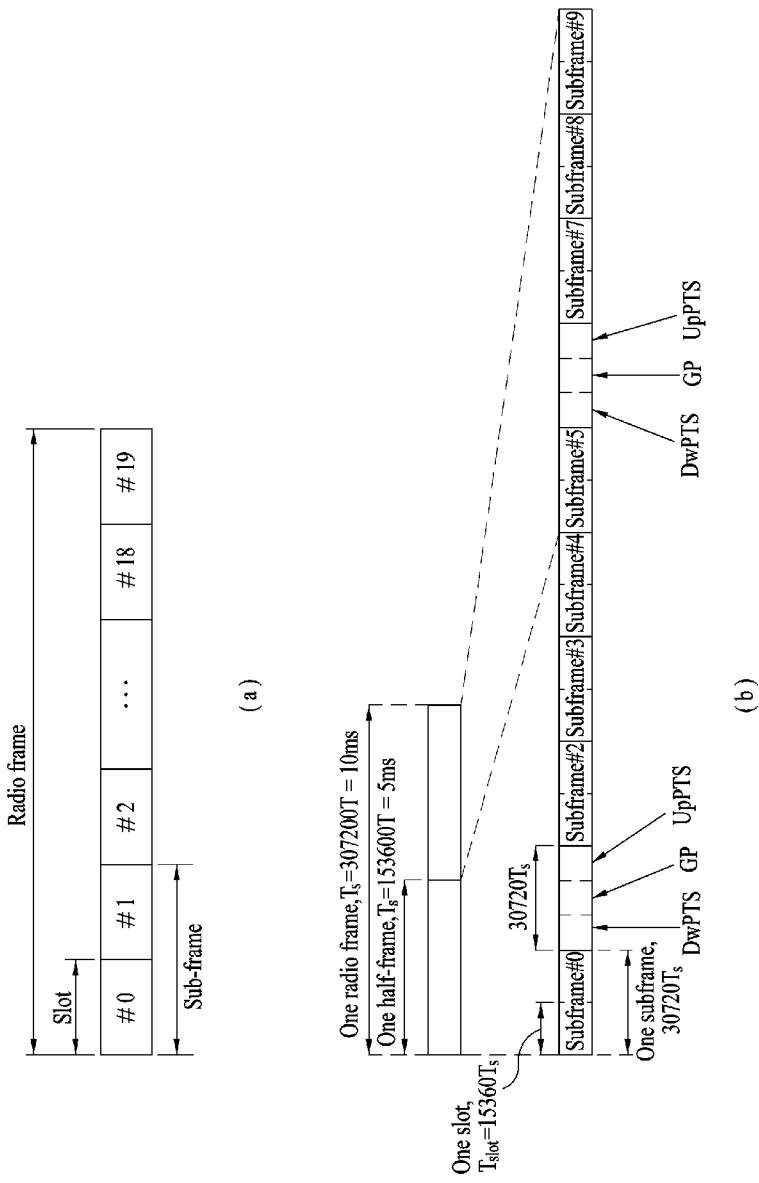
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
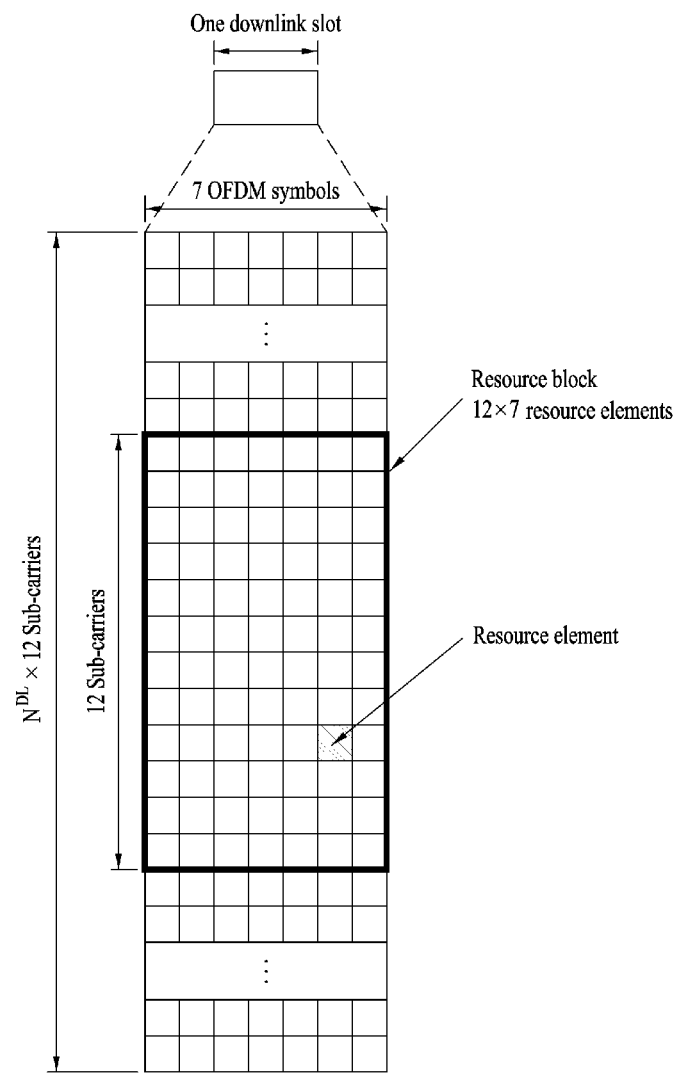
FIG. 5 illustrates a resource grid of a DL slot.

FIG. 5 illustrates a resource grid of a DL slot.

Referring to FIG. 5, a DL slot includes $N_{symb}^{DL}$ OFDM symbols in the time domain and $N_{RB}^{DL}$ RBs in the frequency domain. Each RB includes $N_{sc}^{RB}$ subcarriers and thus the DL slot includes $N_{RB}^{DL} \times N_{sc}^{RB}$ subcarriers in the frequency domain. Although FIG. 5 illustrates the case in which a DL slot includes 7 OFDM symbols and an RB includes 12 subcarriers, the present invention is not limited thereto. For example, the number of OFDM symbols included in the DL slot may differ according to CP length.

Each element on the resource grid is referred to as a resource element (RE). One RE is indicated by one OFDM symbol index and one subcarrier index. One RB includes $N_{symb}^{DL} \times N_{sc}^{RB}$ REs. The number of RBs, $N_{RB}^{DL}$, included in a DL slot depends on DL bandwidth configured in a cell.

Figure 6:
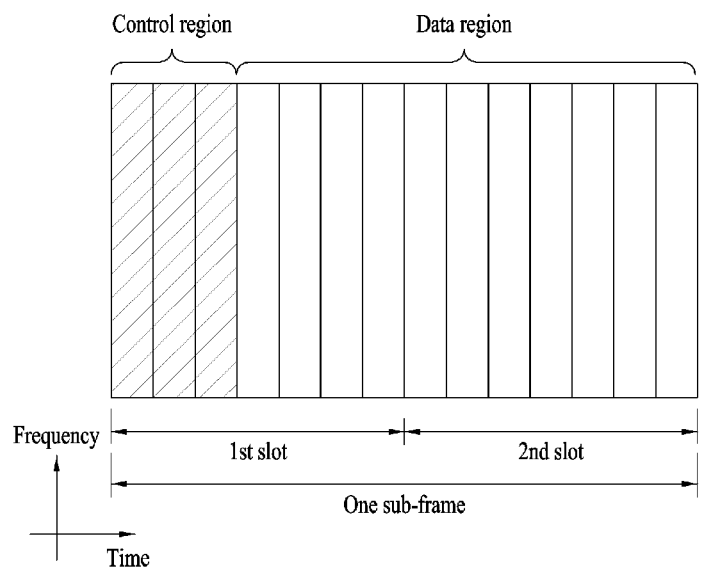
FIG. 6 illustrates the structure of a DL subframe.

FIG. 6 illustrates the structure of a DL subframe.

Referring to FIG. 6, up to three (or four) OFDM symbols at the start of the first slot of a DL subframe are used as a control region to which control channels are allocated and the other OFDM symbols of the DL subframe are used as a

TABLE 1

| | Normal cyclic prefix in downlink | | | Extended cyclic prefix in downlink | | |
|---|---|---|---|---|---|---|
| | | UpPTS | | | UpPTS | |
| | | Normal | Extended | | Normal cyclic | Extended cyclic |
| Special subframe configuration | DwPTS | cyclic prefix in uplink | cyclic prefix in uplink | DwPTS | prefix in uplink | prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the meantime, the structure of the type 2 radio frame, that is, uplink/downlink configuration (UL/DL configuration) in the TDD system is as illustrated in Table 2 below.

data region to which a PDSCH is allocated. DL control channels defined for an LTE system include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH delivers a HARQ ACK/NACK signal as a response to UL transmission.

Control information carried on the PDCCH is called downlink control information (DCI). The DCI transports resource allocation information and other control information for a UE or a UE group. For example, the DCI includes DL/UL scheduling information, UL transmit (Tx) power control commands, etc.

The PDCCH delivers information about resource allocation and a transport format for a downlink shared channel (DL-SCH), information about resource allocation and a transport format for an uplink shared channel (UL-SCH), paging information of a paging channel (PCH), system information on the DL-SCH, information about resource allocation for a higher-layer control message such as a random access response transmitted on the PDSCH, a set of transmit power control commands for individual UEs of a UE group, Tx power control commands, voice over Internet protocol (VoIP) activation indication information, etc. A plurality of PDCCHs may be transmitted in the control region. A UE may monitor a plurality of PDCCHs. A PDCCH is transmitted on an aggregate of one or more consecutive control channel elements (CCEs). A CCE is a logical allocation unit used to provide a PDCCH at a coding rate based on the state of a radio channel. A CCE corresponds to a plurality of resource element groups (REGs). The format of a PDCCH and the number of available bits for the PDCCH are determined according to the number of CCEs. An eNB determines a PDCCH format according to DCI transmitted to a UE and attaches a cyclic redundancy check (CRC) to control information. The CRC is masked with an identifier (ID) (e.g. a radio network temporary identifier (RNTI)) according to the owner or use of the PDCCH. If the PDCCH is destined for a specific UE, the CRC may be masked with a cell-RNTI (C-RNTI) of the UE. If the PDCCH carries a paging message, the CRC may be masked with a paging ID (P-RNTI). If the PDCCH carries system information (particularly, a system information block (SIB)), the CRC may be masked with a system information RNTI (SI-RNTI). If the PDCCH is designated as a random access response, the CRC may be masked with a random access-RNTI (RA-RNTI).

Figure 7:
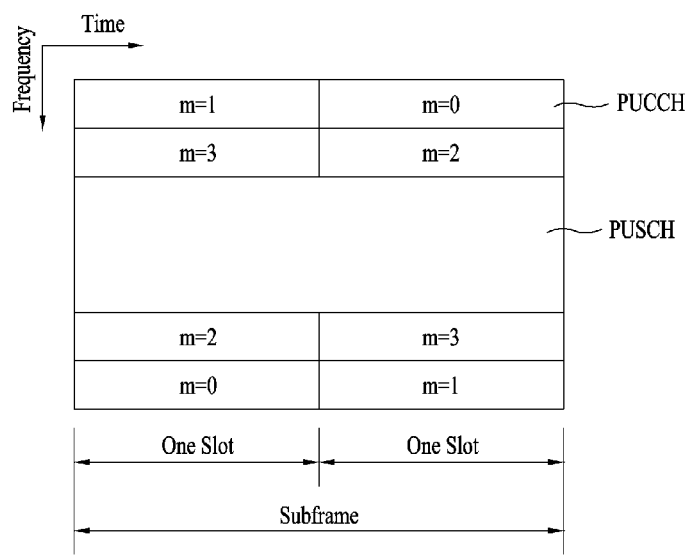
FIG. 7 illustrates the structure of a UL subframe in an LTE system.

FIG. 7 illustrates the structure of a UL subframe in an LTE system.

Referring to FIG. 7, a UL subframe includes a plurality of (e.g. 2) slots. A slot may include a different number of SC-FDMA symbols according to CP length. The UL subframe is divided into a control region and a data region in the frequency domain. The data region includes a PUSCH to transmit a data signal such as voice and the control region includes a PUCCH to transmit UCI. The PUCCH occupies a pair of RBs at both ends of the data region in the frequency domain and the RB pair frequency-hops over a slot boundary.

The PUCCH may deliver the following control information.

SR: SR is information requesting UL-SCH resources and is transmitted using on-off keying (OOK).

HARQ ACK/NACK: HARQ ACK/NACK is a response signal to a DL data packet received on a PDSCH, indicating whether the DL data packet has been successfully received. 1-bit ACK/NACK is transmitted as a response to a single DL codeword and 2-bit ACK/NACK is transmitted as a response to two DL codewords.

CSI: CSI is feedback information regarding a DL channel. CSI includes a CQI and multiple input multiple output (MIMO)-related feedback information includes an RI, a PMI, a precoding type indicator (PTI), etc. The CSI occupies 20 bits per subframe.

The amount of UCI that the UE may transmit in a subframe depends on the number of SC-FDMA symbols available for transmission of control information. The remaining SC-FDMA symbols except for SC-FDMA symbols allocated to RSs in a subframe are available for transmission of control information. If the subframe carries an SRS, the last SC-FDMA symbol of the subframe is also excluded in transmitting the control information. The RSs are used for coherent detection of the PUCCH.

A description of device-to-device (D2D) communication will be given hereinbelow.

D2D communication may be broadly classified into a network/coordination station (e.g., eNB)-assisted D2D communication scheme and a non-assisted D2D communication scheme.

Referring to FIG. 8, a network/coordination station intervenes in transmission and reception of a control signal (e.g., a grant message), HARQ, CSI, etc. and only data transmission and reception are performed between D2D UEs in FIG. 8(a). In FIG. 8(b), a network provides only minimal information (e.g., information about a D2D connection available in a cell) and D2D UEs establish a link and perform data transmission and reception via the link.

The following description is given of a method for a specific D2D UE to efficiently decode a discovery signal (DS) in an environment in which communication between UEs (i.e., D2D communication) proposed in the present invention is performed.

For convenience of description, the present invention will be described based on a 3GPP LTE system. However, the range of a system to which the present invention is applied may be extended to other systems in addition to the 3GPP LTE system. In addition, embodiments of the present invention may be extensively applied even when a new time resource domain and/or a new frequency resource domain (different from a conventional time resource domain and/or a conventional frequency resource domain) are (re)allocated for D2D communication as well as when a partial time resource domain and/or a partial frequency resource domain of a legacy system are allocated for D2D communication.

D2D communication may be broadly divided into two phases. The first one is a "Discovery Phase" in which a DS is transmitted/received between D2D UEs. In this case, a sequence of a DS transmitted by a specific D2D UE may be generated by a function with, as an input variable, i) an ID of the D2D UE (UE ID), ii) a group ID, iii) a preallocated new UE ID, or iv) a time/frequency resource index on which the DS is transmitted. Therefore, an arbitrary D2D UE may discern, through the Discovery Phase, whether it is adjacent to another D2D UE and/or whether D2D data communication can be performed with another D2D UE.

The second one is a "Communication Phase". The Communication Phase includes i) an operation in which a specific D2D UE actually performs D2D data communication with another D2D UE discerned through the first phase (i.e., Discovery Phase) and/or ii) an operation in which a specific D2D UE performs predefined prerequisite procedures (i.e., "D2D link setup procedure", e.g., resource assignment, modulation and coding scheme (MCS) setup, power control, synchronization control, etc.) necessary for stable D2D data communication.

The concept of the above-described D2D communication is purely one of various D2D communication situations to which the present invention is applicable and the present invention described below may also be extensively applied to D2D communication situations of other concepts/configurations/scenarios.

FIG. 9 illustrates various exemplary environments or scenarios in which D2D communication (e.g., Discovery Phase and/or Communication Phase) is performed.

In FIG. 9, D2D communication may be performed in the case in which D2D UEs performing D2D communication are within network coverage (D2D discovery/communication within network coverage) as illustrated in FIG. 9(a), the case in which D2D UEs performing D2D communication are outside network coverage (D2D discovery/communication outside network coverage (for public safety only)) as illustrated in FIG. 9(b), or the case in which some D2D UEs performing D2D communication are within network coverage and the other D2D UEs are outside network coverage (D2D discovery/communication of partial network coverage) as illustrated in FIG. 9(c).

Signal transmission/reception procedures and signal information configurations demanded in the Discovery Phase and/or the Communication Phase for individual environments or scenarios of FIG. 9 (i.e., FIG. 9(a) to FIG. 9(c)) may be differently defined.

For example, after reception information in a physical resource domain (e.g., a physical resource block (PRB)) is reconstructed (or remapped) in a logical resource domain (e.g., a virtual resource block (VRB)) according to a predefined rule, a DS decoding operation of a specific D2D UE may be configured to be performed in the corresponding logical resource domain. For convenience of description of the present invention, it will be assumed hereinbelow that the reception information in the physical resource domain is reconstructed in the logical resource domain. However, embodiments of the present invention may be extensively applied to the case in which the DS decoding operation is (directly) performed in the physical resource domain without a process in which the reception information in the physical resource domain is reconstructed (or remapped) in the logical resource domain.

For example, a maximum number of DSs transmitted in a physical resource domain for DS transmission at a specific time and a maximum number of DSs that a D2D UE can decode in a logical resource domain reconstructed based on a predefined rule (from the physical resource domain) at the specific time may be equally set or may be differently set in some cases. The case in which a maximum number of DSs transmitted in the physical resource domain and a maximum number of DSs that a D2D UE can decode in the logical resource domain differ may occur for reasons of limitations on (for example) hardware/software implementation of the D2D UE or limitations on increase of complexity of the D2D UE related to a DS decoding operation.

FIG. 10 is a diagram referred to for explaining the case in which DS related information received in a physical resource domain (e.g., a PRB) is reconstructed (or remapped) in a logical resource domain (e.g., a VRB) according to predefined configuration/rule/function. In FIG. 10, it is assumed that a maximum of K_P DSs is transmitted in a physical resource domain used for DS transmission designated at a specific time and a D2D UE can decode a maximum of K_L DSs in a logical resource domain reconstructed from the physical resource domain.

Under the above assumption, the case in which a logical resource domain reconstructed from a physical resource domain used for DS transmission designated at a specific time is configured with the same number of (candidate) DSs as a maximum number of DSs (i.e., K_P DSs) transmitted in the physical resource domain may be represented as illustrated in FIG. 10(a). Alternatively, the case in which the logical resource domain is configured with the same number of (candidate) DSs as a maximum number of DSs (i.e., K_L DSs) that a D2D UE can decode in the logical resource domain may be represented as illustrated in FIG. 10(b). In this case, regardless of the configuration/rule/scenario that is applied, a total number of DSs that the D2D UE finally decodes in the logical resource domain is K_L.

That is, an efficient DS decoding operation of the D2D UE requires i) a method for decoding as many DSs transmitted by different D2D UEs as possible within a relatively short time, ii) a method for efficiently selecting a maximum number of DSs that the D2D UE can decode from among (candidate) DSs in a logical resource domain (or a physical resource domain), and/or iii) a method for randomizing reception of interference. In this case, interference may represent interference caused by other D2D UEs performing D2D communication, interference caused by other UEs performing communication with an eNB, or interference (i.e., in-band emission) caused by a channel (transmission) of low power from channel transmission of high power due to non-ideal characteristics of an amplifier in terms of a specific UE.

DS Detection Method

Hereinafter, an efficient DS decoding method for satisfying the above-described requirements will be proposed.

Embodiments of the present invention may be extensively applied to the case in which a maximum number of DSs transmitted in a physical resource domain for DS transmission at a specific time is different from a maximum number of DSs that a D2D UE can decode in a logical resource domain reconstructed based on the predefined rule (from the physical resource domain) at the specific time as well as the case in which they are equal. In addition, the embodiments of the present invention may be extensively applied to both the case in which a logical resource domain reconstructed from a physical resource domain used for DS transmission designated at a specific time is configured with the same number of (candidate) DSs as a maximum number of DSs (i.e., K_P DSs) transmitted in the physical resource domain (i.e., FIG. 10(a)) and the case in which the logical resource domain is configured with the same number of (candidate) DSs as a maximum number of DSs (i.e., K_L DSs) that the D2D UE can decode in the logical resource domain (i.e., FIG. 10(b)).

First Embodiment

According to the present invention, an operation of configuring a logical resource domain, which is reconstructed from a physical resource domain used for DS transmission designated at a specific time, with the same number of (candidate) DSs as a maximum number of DSs (i.e., K_P DSs) transmitted in the physical resource domain and selecting a maximum number of DSs (i.e., K_L DSs) that a D2D UE can decode (or should decode) in the logical resource domain from among the K_P (candidate) DSs may be configured to be randomized/hopped/changed by some or all parameters described below.

Further, according to this embodiment, an operation of selecting the K_L DSs that a D2D UE can decode (or should decode) from among the K_P (candidate) DSs in the reconstructed logical resource domain at a specific time may be interpreted as one of i) an operation of selecting K_L location indexes from among K_P location indexes in the logical resource domain and ii) an operation of selecting K_L resource indexes from among K_P resource indexes in the logical resource domain.

Hereinafter, for convenience of description, a D2D UE performing a DS decoding operation or a D2D data decoding operation at a specific time will be referred to as a D2D reception (Rx) UE and a D2D UE performing a DS transmission operation or a D2D data transmission operation at a specific time will be referred to as a D2S transmission (Tx) UE. In addition, a time resource index represents, for example, an OFDM symbol index, a slot index, a subframe index, etc. and a frequency resource index represents, for example, an RB index, an RB group (RBG) index, a subcarrier index, etc.

Additionally, an ID of a D2D UE described below may denote, for example, a legacy UE ID (or a legacy UE group ID) of the D2D UE (e.g., a C-RNTI, a temporary C-RNTI, or an RA-RNATI) or a D2D UE ID (or a D2D UE group ID) allocated additionally for D2D communication.

At least one parameter for randomization/hopping/change explained based on the above description is as follows.

An ID of a D2D Rx UE.
An ID of a D2D Tx UE with which the D2D Rx UE desires to perform D2D communication (later).
A time resource index of a time at which the D2D Rx UE performs a DS decoding operation.
Parameters related to a physical resource domain for DS transmission designated at a specific time or parameters related to a physical resource domain in which the D2D Rx UE performs monitoring for a DS decoding operation at a specific time. In this case, the parameters related to the physical resource domain may be a frequency resource index and/or a time resource index. For example, in consideration of irregular appearance of DS transmission subframes of a specific D2D UE, the time resource index (i.e., a subframe index) may represent a reindexed subframe index other than a cell-common subframe index. In addition, a reindexing configuration/rule may be defined such that an index of the first subframe appearing in a set of DS transmission subframes of a specific D2D UE is reset to 0. The time resource index (i.e., a subframe index) may be configured to indicate the cell-common subframe index.
A DS resource index of the D2D Rx UE (e.g., a DS cyclic shift (CS) index, etc.).
A DS resource index of the D2D Tx UE.
A DS transmission cycle of the D2D Rx UE.
A DS transmission cycle of the D2D Tx UE with which the D2D Rx UE desires to perform D2D communication (later).
A service type of D2D communication that the D2D Rx UE desires to perform D2D communication (later) (e.g., a public safety related D2D service, a commercial D2D service, a groupcast D2D service, a unicast D2D service, a broadcast D2D service, a multicast D2D service, etc.).

Second Embodiment

A method of selecting a maximum number of DSs (i.e., K_L DSs) that a D2D UE can decode (or should decode) (in a logical resource domain) from among K_P (candidate) DSs in a reconstructed logical resource domain at a specific time may be configured to satisfy some or all of characteristics (i.e., at least one of Properties A and B) described below.

In this case, the method of selecting the K_L DSs that a D2D UE can decode (or should decode) from among the K_P (candidate) DSs in a reconstructed logical resource domain at a specific time may be interpreted as i) an operation of selecting K_L location indexes from among K_P location indexes in the corresponding logical resource domain or ii) an operation of selecting K_L resource indexes from among K_P resource indexes (logical resource indexes) present in the corresponding logical resource domain.

For convenience of description, sets consisting of the K_L location indexes (or the K_L resource indexes) on which a specific D2D UE performs decoding at an n-th DS decoding time and an (n+i)-th DS decoding time (where i is a non-zero integer) will be referred to as DS_Set(n) and DS_Set(n+i), respectively.

According to an embodiment of the present invention, a specific D2D UE can decode as many DSs transmitted by different D2D UE as possible within a relatively short time. In addition, according to the present invention, a probability that the specific D2D UE repeatedly decodes DSs transmitted by the same D2D UE at adjacent DS decoding times can be decreased.

[Property #A] This property causes DS_Set(n) and DS_Set(n+i) to include as different DSs of D2D UEs as possible.

That is, K_L DSs that a specific D2D UE decodes at an n-th DS decoding time and K_L DSs that the specific D2D UE decodes at an (n+i)-th DS decoding time (where i is a non-zero integer) are configured as differently as possible.

[Property #B] This property causes location indexes in DS_Set(n) and DS_Set(n+i) to overlap as little as possible.

That is, this property means that a set consisting of K_L location indexes on which a specific D2D UE performs decoding at an n-th DS decoding time and a set consisting of K_L location indexes on which the specific D2D UE performs decoding at an (n+i)-th DS decoding time are configured to overlap as little as possible. In this case, an i value may be set to i) an integer less than K_P/K_L, ii) an integer equal to or less than a descending value of K_P/K_L (i.e., Floor (K_P/K_L)), or iii) an integer less than an ascending value of K_P/K_L (i.e., Ceiling(K_P/K_L)). Assuming that (candidate) DSs corresponding to the K_L location indexes are simultaneously decoded in a logical resource domain configured with the K_P location indexes, the logic resource region may include location indexes or (candidate) DSs for which decoding operations performed a maximum of (descending value of K_P/K_L) times (i.e., Floor(K_P/K_L) times) do not overlap by applying [Property #B]. In addition, [Property #B] is especially useful when location indexes (or resource indexes (logical resource indexes)) in the logical resource domain of DSs that a specific D2D UE transmits are fixed.

Figure 11:
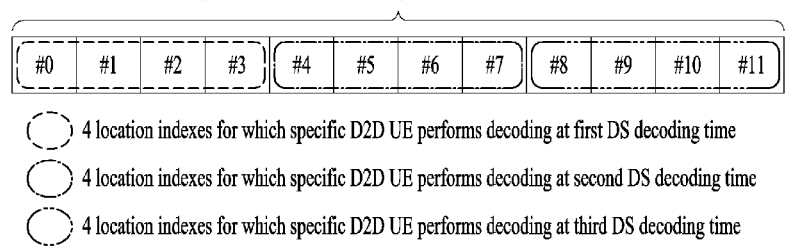
FIG. 11 is a diagram referred to for explaining characteristics related to resources for detecting a DS according to an embodiment of the present invention.

FIG. 11 is a diagram referred to for explaining the case in which [Property #B] is applied to the second embodiment. In FIG. 11, it is assumed that a logical resource domain is configured with 12 (i.e., K_P) location indexes (or resource indexes) and a D2D UE can decode four (i.e., K_L) DSs at a specific DS decoding time.

It may be understood in FIG. 11 that the location indexes (or the resource indexes) that the D2D UE decodes are shifted by an offset value of 4 (i.e., K_L) according to change of a DS decoding time and, thus, a maximum of three (i.e., Floor(12/4)) decoding operations is performed on non-overlapping location indexes (or resource indexes). The location indexes (or resource indexes) for which the D2D UE performs decoding may be interpreted as being changed/randomized/hopped according a subframe index variation for DS decoding and corresponding subframe indexes may be configured to indicate reindexed subframe indexes rather than cell-common subframe indexes in consideration of irregular appearance of DS transmission subframes of a specific D2D UE. In this case, a reindexing configuration/rule may be defined such that an index of the first subframe appearing in a DS transmission subframe set of a specific D2D UE is reset to '0'. Alternatively, the subframe indexes may be configured to indicate the cell-common subframe indexes.

Moreover, in consideration of a predefined discovery time requirement and/or battery consumption of a D2D UE, a DS transmission cycle of the D2D UE may be defined to have a UE-specific characteristic.

Third Embodiment

According to the third embodiment of the present invention, a configuration/rule for reconstructing a logical resource domain from a physical resource domain used for DS transmission designated at a specific time may be configured to be randomized/hopped/changed based on predefined parameters. For example, the configuration/rule for reconstructing a logical resource domain from a physical resource domain used for DS transmission designated at a specific time may be configured to reconstruct i) a logical resource domain configured with K_P (candidate) DSs from a corresponding physical resource domain or ii) a logical resource domain configured with K_L (candidate) DSs, when K_P DSs are transmitted in the physical resource domain used for DS transmission designated at a specific time and the configuration/rule may be configured to be randomized/hopped/changed based on the predefined parameters.

The parameters for the present embodiment may be defined to include at least a part (i.e., some or all) of the parameters listed in the above-described first embodiment. For a detailed description of the parameters, refers to the above description of First Embodiment. The present embodiment may be interpreted as randomizing/hopping/changing a remapping configuration/rule between a physical resource domain and a logical resource domain or randomizing/hopping/changing a linkage configuration/rule.

Additionally, when the present embodiment is applied, location indexes (or resource indexes (logical resource indexes)) in a logical resource domain of DSs transmitted by a specific D2D UE may be fixed. As an example, although location indexes (or resource indexes) in a physical resource domain on which the specific D2D UE transmits DSs are changed, location indexes (or resource indexes (logical resource indexes) of DSs transmitted by the specific D2D UE in the logical resource domain may appear fixed due to randomization/hopping/change according to reconstruction configuration/rule between the physical resource domain and the logical resource domain.

In addition, a reconstruction relationship between a physical resource domain used for DS transmission at a specific time and a logical resource domain may be configured to change i) locations in a logical resource domain linked with DSs of a specific D2D UE at a fixed state (e.g., similar to an operation of an EPDCCH), ii) locations in a logical resource domain linked with DSs of a specific D2D UE (e.g., similar to an operation of a PDCCH) while a reconstruction relationship between a physical resource domain used for DS transmission designated at a specific time and a logical resource domain is changed, or iii) only locations in a physical resource domain in which DSs of a specific D2D UE are transmitted in a state in which locations in a logical resource domain linked with DSs of a specific D2D UE are fixed (e.g., the case in which DS transmission resource locations of the specific D2D UE in a physical resource domain are determined by a predefined frequency hopping pattern of the specific D2D UE and a reconstruction relationship between a physical resource domain and a logical resource domain is defined in consideration of the frequency hopping pattern). In this case, the change operations may be performed based on predefined parameters and the parameters may be defined as some or all of the parameters listed in the first embodiment.

Fourth Embodiment

According to the fourth embodiment of the present invention, location indexes (or resource indexes (logical resource indexes)) that a specific D2D UE decodes in a logical resource region may be fixed and location indexes (or resource indexes) in a physical resource domain and/or location indexes (or resource indexes) in a logical resource domain, used for DS transmission of an individual D2D UE, may be configured to be randomized/hopped/changed.

The fourth embodiment of the present invention is useful when a specific D2D UE decodes only i) a fixed number of DSs in a logical resource domain, ii) a fixed number of location indexes, or iii) resource indexes (logical resource indexes).

For efficient multiplexing or packing of DS resources, a consecutive collision problem of DSs between the same D2D UEs in an environment in which pseudo orthogonality of the DS resources rather than perfect orthogonality is applied can be solved by applying the present embodiment.

Fifth Embodiment

According to the fifth embodiment of the present invention, when a specific D2D UE can discern location indexes or resource indexes (logical resource indexes) in a DS related logical resource domain of D2D UEs in which the specific D2D UE is interested based on a predefined configuration/rule, the specific D2D UE may be configured to decode a predefined number of DSs (e.g., K_L DSs) of D2D UEs based on some or all of parameters described below, i.e., at least one associated parameter among i) delay counter values of D2D UEs in which a specific D2D UE is interested, ii) DS transmission cycle values of D2D UEs in which a specific D2D UE is interested, iii) service types of D2D communication of D2D UEs in which a specific D2D UE is interested, iv) selection/non-selection of a D2D cluster head of D2D UEs in which a specific D2D UE is interested, v) selection/non-selection of a relay D2D UE of D2D UEs in which a specific D2D UE is interested, vi) success or failure of DS decoding by D2D UEs in which a specific D2D UE is interested at a previous DS decoding time, vii) selection/non-selection of DSs of D2D UEs in which a specific D2D UE is interested at a previous DS decoding time.

The present embodiment may also be extended when the specific D2D UE is capable of discerning location indexes or resource indexes in a DS related physical resource domain of D2D UEs in which the specific D2D UE is interested in based on a predefined configuration/rule. In this case, the specific D2D UE may discern location indexes or resource indexes in a DS related logical resource domain of D2D UEs in which the specific D2D UE is interested based on a configuration/rule for reconstruction (or remapping or linkage) between a physical resource domain and a logical resource domain.

First, delay counter values of D2D UEs in which a specific D2D UE is interested are defined. According to this parameter, (initial) delay counter values may be allocated to respective D2D UEs and then may be increased or decreased by a predefined configuration/rule. In addition, DSs related to D2D UEs having a relatively large delay counter value at a specific DS decoding time may be configured to be decoded (selected) first.

A delay counter value of a D2D UE may be configured to be increased whenever the delay counter value is not selected (decoded) at a predefined DS decoding time. In this case, an increase (or increment) of the delay counter value may be differently set or may be changed according to i) a DS transmission cycle of a D2D UE, ii) a service type of D2D communication of a D2D UE (e.g., a public safety related D2D service, a commercial D2D service, a groupcast D2D service, a unicast D2D service, a broadcast D2D service, a multicast D2D service, etc.), iii) selection/non-selection of a D2D cluster head of D2D UEs, iv) success or failure of DS decoding by a D2D UE at a previous DS decoding time, and/or iv) selection/non-selection of a DS of a D2D UE at a previous DS decoding time. Specifically, an increase (or increment) of the delay counter value may be set to a relatively large value with respect to a D2D UE having a relatively long DS transmission cycle.

If a DS of a specific D2D UE has been decoded successfully or selected at a DS decoding time, a delay counter value of the D2D UE may be reset to a predefined initial value (e.g., 0) or may be set to a value obtained by subtracting a predefined value from the delay counter value of the D2D UE. Alternatively, if the DS of the specific D2D UE has attempted to be decoded (or selected) at a DS decoding time but has not been successfully decoded, the delay counter value of the D2D UE is not reset to a predefined initial value (i.e., 0) and may be set to a value obtained by subtracting a predetermined value from the delay counter value. Accordingly, an opportunity of attempting to decode (or select) again the DS of the specific D2D UE at a next DS decoding time can be guaranteed to some degree by applying such setting.

DS transmission cycle values of D2D UEs in which a specific D2D UE is interested will now be described. According to this parameter, a DS related to a D2D UE having a relatively long DS transmission cycle at a specific DS decoding time may be configured to be decoded (or selected) first.

Next, according to service types of D2D communication of D2D UEs in which a specific D2D UE is interested, a DS of a D2D UE performing a public safety related D2D service or a broadcast D2D service at a specific DS decoding time may be configured to be decoded (or selected) first.

Selection/non-selection of a D2D cluster head of D2D UEs in which a specific D2D UE is interested will now be described. A D2D cluster may consist of, for example, D2D UEs having an average channel state (e.g., an average signal to interference-plus-noise ratio (SINR)) above a threshold value predefined by a specific D2D UE and a specific D2D UE corresponding to a center (or reference) of the D2D cluster may be defined as the D2D cluster head. Members of the D2D cluster may equalize time/frequency synchronization thereof through a predefined signal (e.g., a DS) transmitted by the D2D cluster head in order to perform stable communication (e.g., DS decoding or D2D data decoding) between D2D UEs belonging to the D2D cluster. In addition, the cluster head may schedule (or control) a signal transmission operation of the members in consideration of signal transmission collision (or interference) between the members constituting the cluster. Accordingly, when an operation of the D2D cluster is considered, signals (e.g., DSs) transmitted by the D2D cluster head may be configured to be relatively important. In addition, a DS related to a D2D UE selected as the D2D cluster head at a specific DS decoding time may be configured to be decoded (or selected) first.

Selection/non-selection of a relay D2D UE of D2D UEs in which a specific D2D UE is interested will now be described. The relay D2D UE refers to a UE that retransmits information received from an eNB or a D2D UE to another D2D UE located in a relatively shadowy area in communication (e.g., in an out-of-coverage or partial coverage area). Information that the relay D2D UE retransmits may consist of relatively important information, for example, broadcast information (or system information) or control information used for interference mitigation. Accordingly, in consideration of importance of an operation of the relay D2D UE or retransmitted information, signals (e.g., DSs) transmitted by the relay D2D UE may be configured to be relatively important. In addition, a DS related to a D2D UE selected as the relay D2D UE at a specific decoding time may be configured to be decoded (or selected) first. Alternatively, a DS related to a relay-capable D2D UE at a specific DS decoding time may be configured to be decoded (or selected) first.

Success or failure of DS coding by D2D UEs in which a specific D2D UE is interested at a previous DS decoding time will now be described. A DS related to a D2D UE that has not successfully performed decoding at a previous DS decoding time may be configured to be decoded (selected) first at a specific DS decoding time.

Next, according to selection/non-selection of D2D UEs in which a specific D2D UE is interested at a previous DS decoding time, a DS related to a D2D UE that has not been selected at a previous DS decoding time may be configured to be decoded (selected) first at a specific DS decoding time.

Sixth Embodiment

According to the sixth embodiment of the present invention, a DS of a D2D UE may be decoded based on a reference signal (RS) which is predefined or designated through physical layer signaling or higher signaling. In this case, the RS may be defined as a signal used to estimate an effective channel over which a DS of a specific D2D UE is transmitted and (some or all of) different RS resources (e.g., antenna port numbers, CS indexes, sequence generation related input parameters (e.g., scrambling IDs, physical(/virtual) cell IDs, etc.), orthogonal cover codes (OCC) indexes, (orthogonal) location indexes in a physical resource domain, etc.) may be allocated to DSs of D2D UEs. For example, a plurality of DSs transmitted simultaneously at a specific time by different D2D UEs may be spatial-division or code-division multiplexed by allocating (some or all of) different RS resources to DSs.

A D2D UE (e.g., D2D signal Tx UE) may be configured to randomly select a (partial) RS resource (set) to be used for DS decoding from an RS resource candidate pool which is presignaled by a cell/D2D cluster head/D2D relay UE or which is predefined (e.g., such an operation may be interpreted in a such manner that a D2D UE (i.e., D2D signal Tx UE) randomly selects an RS resource (set) to be used for DS transmission from a presignaled or predefined RS resource candidate pool. Accordingly, when such scheme is applied, a D2D signal Rx UE for example performs blind detection for an RS resource used by the D2D signal Tx UE (in the presignaled or predefined RS resource candidate pool)). For example, the RS resource candidate pool may be defined i) in a cell-specific form, ii) in a UE-specific form, iii) in a UE group-specific form, iv) or in a (re)configurability form.

Some parameters of RS related resources used for DS decoding (or DS transmission), for example, at least one of an antenna port number, a CS index, sequence generation related input parameters (e.g., a scrambling ID, a physical (virtual) cell ID, etc.), an OCC index, and an (orthogonal) location index in a physical resource domain may be configured to be fixedly used UE-specifically/UE-group specifically/cell-specifically.

A specific parameter among RS related resources used for DS decoding (or DS transmission) may be configured to be used only in a limited number/range within a conventionally selectable number/range. For example, although there are conventionally 8 DM-RS related CS resources, only four predesignated (or presignaled) DM-RS related CS resources among the 8 resources may be configured to be used for DS decoding (or DS transmission).

An RS resource (or RS resource index) used for DS decoding by a D2D (Rx) UE or selected (by a D2D Tx UE) at a specific time may be configured to be changed/randomized by at least one of (i.e., some or all of) parameters listed in the above-described first embodiment.

A DS transmitted at a specific location in a physical resource domain or a DS transmitted by a specific D2D (Tx) UE may be configured to be linked with a specific RS resource according to a predefined configuration/rule.

If a DS of a D2D UE (e.g., D2D signal Tx UE) is decoded based on a predefined RS (by a D2D signal Rx UE), a predefined number of DSs (e.g., K_L DSs) of D2D UEs may be configured to be decoded first based on RS (or RS resource) energy detection (e.g., this may be valid when a D2D UE (i.e., D2D signal Tx UE) randomly selects an RS resource (set) used for DS transmission from a presignaled or predefined RS resource candidate pool). For example, since the number of DSs actually transmitted in a physical resource domain (or a logical resource domain) designated or used for DS transmission at a specific time may be (roughly) discerned through energy detection of an RS (RS resource), a predetermined number of DSs (i.e., K_L DSs) of D2D UEs may be configured to be decoded first based on the discerned number of DSs.

K_L DSs linked with RS resources on which (for example) relatively high energy is detected may be configured to be decoded first or K_L DSs reselected based on at least one of the above-described first to fifth embodiments from among (candidate) DSs linked with RS resources on which energy having a predefined threshold or more is detected may be configured to be decoded first. The threshold may be defined as an absolute value or a relative value. As an example in which the threshold is defined as the relative value, if (all) subcarriers on a specific OFDM symbol (e.g., an OFDM symbol including a CRS of port 0) are used for RS (or RS resource) transmission for DS decoding, only DSs linked with RS resources having a reference signal received power (RSRP) (or a reference signal received quality (RSRQ) or a received signal strength indicator (RSSI)) of a predetermined level or more relative to an RSSI on the corresponding OFDM symbol may be configured to be designated as candidates of a decoding trial.

The preferential DS decoding method based on energy detection of an RS (or RS resource) according to the present embodiment may be extended even when decoding (trial) priority is determined between a predefined number of DSs (i.e., K_L DSs) decoded in a logical resource domain.

Additionally, the preferential DS decoding method based on energy detection of an RS (or RS resource) according to the present embodiment is useful especially when an RS (or RS resource) used for DS decoding is transmitted in a front part of a physical resource domain (e.g., a front part of the time domain) designated for DS transmission. That is, when an RS (or RS resource) for DS decoding is transmitted in the above form, a D2D UE attempting to perform DS decoding can complete energy detection of the RS (or RS resource) within a relatively short time and relatively much time can be allocated to the DS decoding operation.

When the preferential DS decoding method based on energy detection of an RS (or RS resource) according to the present embodiment is applied, a problem may occur of repeatedly selecting (or attempting to decode) DSs of some D2D UEs near a specific D2D UE attempting to perform decoding. This is because a DS related RS resource of a D2D UE located nearby has a high probability of being detected as a DS having high energy.

Therefore, the case in which the preferential DS decoding method based on energy detection of an RS (or RS resource) according to the present embodiment is performed in conjunction with a part of the above-described first to fifth embodiments will now be further described. For example, the preferential DS decoding method based on energy detection of an RS (or RS resource) may solve the problem of repeatedly selecting (or attempting to decode) DSs of some D2D UEs near a specific D2D UE attempting to decode DSs by being combined with a preferential DS decoding method based on the delay counter value of the above-described fifth embodiment.

The preferential DS decoding method based on energy detection of an RS (or RS resource) according to the present embodiment may be configured to first decode K_L DSs reselected based on the above-described first to fifth embodiments from among (candidate) DSs linked with RS resources on which energy higher than average quality (or detection energy) of RS resources is detected (e.g., to achieve proportional fairness (PF)). Alternatively, the preferential DS decoding method based on energy detection of an RS (or RS resource) according to the present embodiment may be configured to first decode K_L DSs reselected based on the above-described first to fifth embodiments among (candidate) DSs linked with RS resources on which energy higher than average quality (or energy) of a predefined specific RS resource is detected (e.g., to achieve PF).

The preferential DS decoding method based on energy detection of an RS (or RS resource) according to the present embodiment may be configured to decode (candidate) DSs linked with a specific RS resource only when detection energy of the specific RS resource is higher than average quality (or energy) of the specific RS resource or may be configured to decode the DSs only when detection energy of a specific DS transmission resource is higher than average quality (or energy) of the specific DS transmission resource.

The preferential DS decoding method based on energy detection of an RS (or RS resource) according to the present embodiment may be used to screen DSs (or DS transmission resources) to be decoded. For example, at a specific DS decoding time, i) DSs linked with RS resources having energy less than a predefined threshold or ii) DSs linked with specific RS resources having quality (or detection energy) of RS resource lower than a predetermined level may be configured to be excluded from decoding trial objects (or selection objects).

In the preferential DS decoding method based on energy detection of an RS (or RS resource) according to the present embodiment, an energy detection operation of RS resources (or RSs) may be replaced with an RSSI/RSRP/RSRQ measurement operation for DS transmission resources in a physical resource domain and a predefined number of DSs (e.g., K_L DSs) of D2D UEs based on the resultant values (reusing the above-described first to fifth embodiments) may be configured to be decoded first.

Seventh Embodiment

According to the seventh embodiment of the present invention, DS transmission in terms of a specific D2D UE may not be performed in every predefined time unit (e.g., a subframe, a slot, or an OFDM symbol) due to a DS collision problem between different D2D UEs and/or a limited capacity of DS resources. Accordingly, the D2D UE may be configured to store DSs received from other D2D UEs at a specific time (e.g., a time at which DS transmission is not performed or a time at which a DS reception operation is performed) in a predefined buffer and to perform a DS decoding operation even at a time at which DS transmission is not performed (including a corresponding DS reception time).

When the present embodiment is applied, a maximum number of DSs that a D2D UE is capable of actually decoding may be changed according to i) an interval between (adjacent) DS transmission timings (e.g., the case in which the DS transmission timings are not equally distributed) or ii) a DS transmission cycle (e.g., the case in which DS transmission timings are equally distributed).

Further, the present embodiment may be configured to be limitedly applied only to the case in which DS transmission timings irregularly appear (or are irregularly configured). Additionally, whether an operation of buffering received DSs is performed may be defined by "UE capability".

Resource Configuration Method of D2D DS

Prior to a detailed description of an embodiment, a D2D DS type and a resource configuration method are indicated in Table 3 below.

TABLE 3

Figure 12:
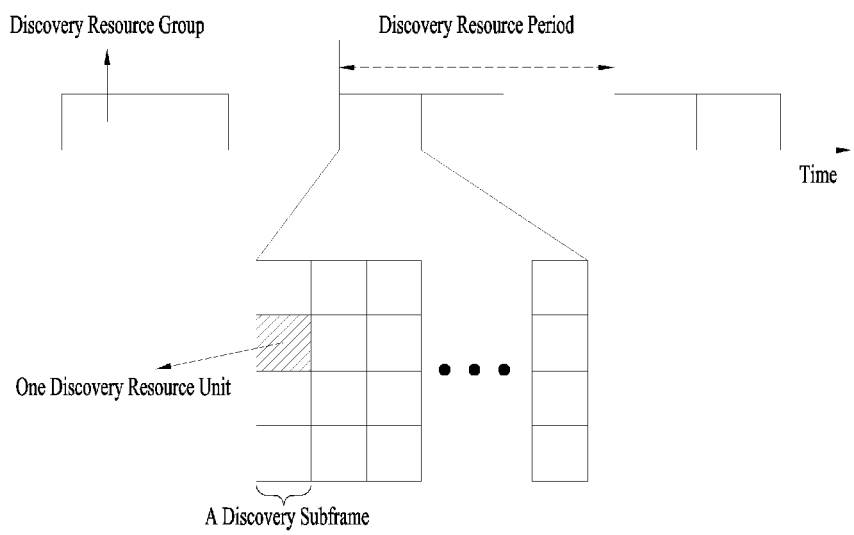
FIG. 12 is a diagram referred to for explaining resource configuration of a D2D DS of TYPE 2.

The details of the two discovery types:
 [TYPE 1]: a discovery procedure where resources for discovery signal transmission are allocated on a non UE specific basis
  Note: Resources can be for all UEs or group of UEs
 [TYPE 2]: a discovery procedure where resources for discovery signal transmission are allocated on a per UE specific basis
  TYPE 2A: Resources are allocated for each specific transmission instance of discovery signals
  TYPE 2B: Resources are semi-persistently allocated for discovery signal transmission
Discovery message transmission resource configuration:
Discovery message transmission resource configuration consists of a number of subframes and a discovery period, and FFS a number of PRBs
 The number of discovery subframes and the discovery period may be semi-statically configured at least when in coverage TABLE 3-continued Individual discovery message transmission resources are not CDM
All individual discovery message transmission resources are the same size FIG. 12 is a diagram referred to for explaining the concept of resource configuration of a D2D DS of TYPE 2 of Table 3. In FIG. 12, a predefined amount of resources that can be used for D2D DS transmission/reception is represented by a discovery resource group (DRG) and a predefined number of discovery subframes (DSFs) and discovery resource units (DRUs) are present on one specific DRG. In addition, a predefined number of DRUs is present in one specific DSF and one specific DRU consists of a predefined number of PRBs.

A DRU size used for D2D DS transmission and a DRU size used for D2D communication may be differently defined. Further, the DRU size may be configured to be changed according to variation of system bandwidth or variation of D2D bandwidth configured for proximity services (ProSe). Alternatively, (re)configurability for the DRU size may be defined.

A predefined number of DRGs is present in one specific discovery period. Additionally, at least one of i) a discovery period configuration value, ii) the number of DRGs present in one specific discovery period, iii) the number of DSFs and DRUs present in one specific DRG, iv) the number of DRUs present in one specific DSF, and v) the number of PRBs constituting one specific DRU may be configured to be semi-statically/dynamically indicated by an eNB to a UE through a predefined signal or to be semi-statically/dynamically indicated by a specific D2D UE to other D2D UEs through a predefined signal.

If a DS of a D2D UE is decoded based on a predefined RS (e.g., a DM-RS) (i.e., the above-described sixth embodiment), the number of blind detection operations for RS (or RS resource) candidates, performed by a D2D UE to decode DSs received from other D2D UEs, at a specific timing or in a DSF of a specific time may be limited. The number of blind detection operations for the corresponding RS (or RS resource) candidates may be limited due to i) limitations in hardware/software implementation of a D2D UE or ii) limitations in increase of D2D UE complexity related to a DS decoding operation. For convenience of description of the present invention, the number of blind detection operations for corresponding RS (or RS resource) candidates of a D2D UE is defined as "BD_NUM".

A total number of RS (or RS resource) candidates for which a D2D UE should perform blind detection to decode DSs received from other D2D UEs at a DSF of a specific time may be defined as "the number of DRUs per DSF (i.e., DRU_NUM)×the number of RS (or RS resource) candidates per DRU (i.e., RS_NUM)". If the number of DRUs per DSF is (relatively) smaller than the number of RS (or RS resource) candidates per DRU, the D2D UE may decode (relatively) more RS (or RS resource) candidates per DRU. In other words, when "BD_NUM=DRU_NUM×RS_NUM", if BD_NUM is set to a (predefined or presignaled) specific value and DRU_NUM decreases, then RS_NUM may increase.

The number of DRUs per DSF (i.e., DRU_NUM) (or the number of PRBs per DRU) may be induced/derived/changed by i) a combination of at least one (i.e., some or all) of parameters listed below, ii) a combination of at least one (i.e., some or all) of signaled values, or iii) a combination of at least one of (i.e., some or all of) parameters listed below and at least one of (i.e., some or all of) parameters listed in the above-described first embodiment.

System bandwidth information or D2D bandwidth information configured for ProSe usage (e.g., if the number of DRUs per DSF (i.e., DRU_NUM) (or the number of PRBs per DRU) is changed/induced/derived by (WAN communication or D2D communication related) system bandwidth information, this may be interpreted as meaning indicating that the number of RS (or RS resource) candidates (per DRU) is also changed/induced/derived by (WAN communication or D2D communication related) system bandwidth information according to the above relationship of "BD_NUM=DRU_NUM×RS_NUM").

A set of DS resource candidates (i.e., a DS resource pool) presignaled by a cell/eNB/D2D cluster head/D2D relay UE. For example, information related to at least one of i) a discovery period configuration value, ii) the number of DRGs present in one specific discovery period, iii) the number of DSFs and DRUs present in one specific DRG, iv) the number of DRUs present in one specific DSF, v) the number of PRBs constituting one specific DRU, vi) a DRG index on which a D2D UE (currently) performs a DS reception operation, vii) indexes of DSFs and DRUs on which a D2D UE (currently) performs a DS reception operation, and viii) a PRB index on which a D2D UE (currently) performs a DS reception operation.

A set of RS (or RS resource) candidates that a D2D UE can select in a DSF of a specific time in a state in which the number of RS (or RS resource) candidates (i.e., RS_NUM) per DRU is fixed (to a preset or presignaled value) may be configured to be changed over time. For example, a variation pattern may be defined i) in a cell-specific form, ii) in a UE-specific form (e.g., the variation pattern may be determined by at least one of (i.e., some or all of) the parameters enumerated in the first embodiment), or ii) in a (re)configurability form.

If a DS of a D2D UE is decoded based on a predefined RS, the number of blind detection operations for RS (or RS resource) candidates performed by a D2D UE for decoding DSs transmitted by other D2D UEs at a specific time (or in a DSF of a specific time) may be limited. The limited value of the blind detection operations may be "(D2D) UE Capability" and the limited value may be linked with "MIMO Capability" of a (D2D) UE. For example, a (D2D) UE that can receive an 8-layer based PDSCH may estimate 8 channels per resource block (RB), whereas a (D2D) UE that can receive only a 1-layer based PDSCH may estimate only one channel per RB.

At least one (i.e., some or all) of the above-described embodiments may be configured to be limitedly applied only in partial predefined situations. For example, the above-described embodiments may be configured to be limitedly applied only in at least one of the cases in which i) a D2D communication mode is configured, ii) a specific service type of D2D communication (e.g., a public safety related D2D service, a commercial D2D service, a groupcast D2D service, a unicast D2D service, a broadcast D2D service, a multicast D2D service, etc.) is performed, iii) a Discovery Phase is performed, iv) a Communication Phase is performed, v) a DS decoding operation is performed, vi) a D2D data decoding operation is performed, vii) a D2D UE is aware of ID information of D2D UEs in which the D2D UE is interested, and viii) a D2D UE is unaware of ID information of D2D UEs in which the D2D UE is interested.

Since the above-described embodiments/methods/configurations of the present invention are interpreted as one embodiment for implementing the present invention, it is obvious that they can be regarded as one embodiment of the present invention. Although the above-described embodiments may be independently implemented, they may be implemented in a combination/aggregation form of some of the embodiments.

The above-described embodiments may be extensively applied to D2D communication in an environment in which a carrier aggregation (CA) scheme is applied.

Information about the above-described embodiments or information as to whether a corresponding configuration/rule/scenario is applied may be indicated by an eNB to a UE through a predefined signal (e.g., a physical layer or higher layer signal).

The above-described embodiments may be configured to be limitedly applied only when a specific D2D UE is aware of DS transmission resource locations of D2D UEs in which the specific D2D UE is interested or a specific D2D UE is unaware of DS transmission resource locations of D2D UEs in which the specific D2D UE is interested. In this case, the meaning that a specific D2D UE is aware of DS transmission resource locations of D2D UEs in which the specific D2D UE is interested may indicate that i) a specific D2D UE is aware of IDs of D2D UEs in which the specific D2D UE is interested and aware of DS transmission resource locations of D2D UEs in which the specific D2D UE is interested through a predefined function (e.g., a DS transmission location of a D2D UE is defined as a function of a UE ID), ii) a specific D2D UE is aware of IDs of D2D UEs in which the specific D2D UE is interested but is unaware of DS transmission resource locations of D2D UEs in which the specific D2D UE is interested because a DS resource location of a D2D UE is influenced by elements (or parameters) other than an ID of the corresponding D2D UE, or iii) a specific D2D UE is unaware of IDs of D2D UEs in which the specific D2D UE is interested but a (predesigned) discovery application properly discovers D2D UEs near to the specific D2D UE and informs the specific D2D UE of the discovered D2D UEs in summary form. In addition, the meaning that a specific D2D UE is unaware of DS transmission resource locations of D2D UEs in which the specific D2D UE is interested may represent the same case in the above-described scheme.

The above-described embodiments may be extensively applied even when T DSs among K_L (where T<K_L) DSs that a specific D2D UE can decode (in a logical resource domain) are of a closed discovery type (i.e., the case in which a specific D2D UE is aware of DS transmission resource locations of D2D UEs in which the specific D2D UE is interested) and the other (i.e., (K_L-T)) DSs are of an open discovery type (i.e., the case in which a specific D2D UE is unaware of DS transmission resource locations of D2D UEs in which the specific D2D UE is interested). In this case, T may be changed based on predefined parameters and the parameters may be defined as some (or all) of the parameters listed in the above-described first embodiment.

Additionally, the above-described embodiments may be extensively applied even when a discovery procedure is performed based on "DS resources allocated on a non-UE specific basis (i.e., resources for a group of UEs or all UEs)" or "DS transmission resources allocated on a per UE-specific basis (i.e., every DS transmission related resource is dynamically allocated or a DS transmission related resource is semi-persistently allocated in terms of a specific UE)".

The above-described embodiments may be extensively applied even when a D2D UE detects only DSs of D2D UEs in which the D2D UE is interested (i.e., closed discovery procedure) or when a D2D UE detects all of DSs of other D2D UEs that can be discovered regardless of interest (i.e., open discovery procedure).

The above-described embodiments may be extensively applied when a location index (or a resource index) of a DS transmitted by a specific D2D UE is fixed or is not fixed. In addition, the above-described embodiments may be extensively applied when a D2D UE decodes D2D data information (in a logical resource domain or a physical resource domain).

Figure 13:
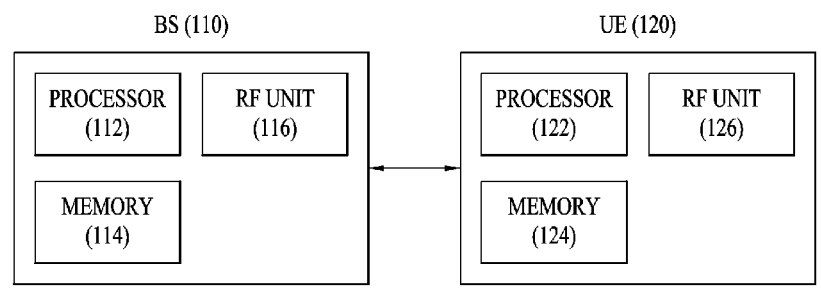
FIG. 13 illustrates a BS and a UE that are applicable to an embodiment of the present invention.

FIG. 13 illustrates a BS and a UE that are applicable to an embodiment of the present invention.

If a wireless communication system includes a relay, communication in a backhaul link is performed between the BS and the relay and communication in an access link is performed between the relay and the UE. Accordingly, the BS or the UE shown in FIG. 13 may be replaced with the relay according to situation.

Referring to FIG. 13, a wireless communication system includes a BS 110 and a UE 120. The BS 110 includes a processor 112, a memory 114, and a radio frequency (RF) unit 116. The processor 112 may be configured to perform the procedures and/or methods proposed in the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124, and an RF unit 126. The processor 122 may be configured to perform the proposed procedures and/or methods according to the present invention. The memory 124 is connected to the processor 122 and stores various types of information related to operations of the processor 122. The RF unit 126 is connected to the processor 122 and transmits and/or receives radio signals. The BS 110 and/or the UE 120 may include a single antenna or multiple antennas.

The embodiments of the present invention described above are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as being performed by the BS in this disclosure may be performed by an upper node of the BS in some cases. That is, it is apparent that, in a network comprised of a plurality of network nodes including the BS, various operations performed for communication with the UE can be performed by the BS or other network nodes other than the BS. The term BS may be replaced with a fixed station, a Node B, an eNode B (eNB), an access point, etc.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit may be located at the interior or exterior of the processor and may transmit and receive data to and from the processor via various known means.

The memory unit may be located inside or outside the processor to exchange data with the processor by a known various means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method for detecting a DS for D2D communication and an apparatus therefor have been described centering on an example applied to a 3GPP LTE system, the present invention is applicable to a variety of wireless communication systems in addition to the 3GPP LTE system.

What is claimed is:

1. A method for detecting a discovery signal for device-to-device (D2D) communication by a first user equipment (UE) in a wireless communication system, the method comprising:
receiving the discovery signal from second UEs; and
acquiring control information for D2D communication by performing blind decoding of the discovery signal based on reference signal parameters including a delay counter defined to measure an effective channel, if the discovery signal is associated with reference signal resources for which an energy above a predefined threshold is detected, and if the discovery signal is associated with one of the second UEs having a corresponding delay counter not equal to 0,
wherein a search space for blind decoding consists of the reference signal resources for which the energy above the predefined threshold is detected.

2. The method according to claim 1,
wherein the discovery signal is identified according to a reference signal resource allocated differently to the second UEs.

3. The method according to claim 2,
wherein the reference signal resource is associated with at least one of an antenna port number, a cyclic shift index, a scrambling identifier, a physical cell identifier, a virtual cell identifier, and an orthogonal cover code (OCC) index.

4. The method according to claim 1,
wherein the discovery signal is blind-decoded based on a reference signal resource randomly selected from a reference signal resource pool signaled from a base station.

5. The method according to claim 4,
wherein the reference signal resource pool is cell-specific.

6. A first user equipment (UE) for detecting a discovery signal for device-to-device (D2D) communication in a wireless communication system, the first UE comprising:
a radio frequency unit; and
a processor,
wherein the processor is configured to receive the discovery signal from second UEs and to acquire control information for D2D communication by performing blind decoding of the discovery signal based on reference signal parameters including a delay counter defined to measure an effective channel, if the discovery signal is associated with reference signal resources for which an energy above a predefined threshold is detected, and if the discovery signal is associated with one of the second UEs having a corresponding delay counter not equal to 0, and
wherein a search space for blind decoding consists of the reference signal resources for which the energy above the predefined threshold is detected.

* * * * *